United States Patent [19]

Mizutani et al.

[11] Patent Number: 4,853,299

[45] Date of Patent: Aug. 1, 1989

[54] SILICON CARBIDE SINTERED BODY AND METHOD OF MANUFACTURING THE SAME

[75] Inventors: Toshiaki Mizutani, Yokohama; Takeyuki Yonezawa, Tokyo; Hiroshi Inoue, Kawaguchi; Akihiko Tsuge, Yokohama; Yoshiyuki Ohnuma, Kawasaki, all of Japan

[73] Assignee: Kabushiki Kaisha Toshiba, Kawasaki, Japan

[21] Appl. No.: 903,141

[22] Filed: Sep. 3, 1986

[30] Foreign Application Priority Data

Sep. 6, 1985 [JP] Japan ................................ 60-195750
Sep. 6, 1985 [JP] Japan ................................ 60-195751
Sep. 6, 1985 [JP] Japan ................................ 60-195754
Jul. 9, 1986 [JP] Japan ................................ 61-159773

[51] Int. Cl.$^4$ ............................................. C04B 35/56
[52] U.S. Cl. ..................................... 428/698; 423/440; 264/60; 264/DIG. 36
[58] Field of Search ........................ 428/698, 699, 446; 423/440; 264/60, DIG. 36, 65, 66

[56] References Cited

U.S. PATENT DOCUMENTS

| | | | |
|---|---|---|---|
| 4,156,051 | 5/1979 | Nakamura et al. | 428/698 X |
| 4,502,983 | 3/1985 | Omori et al. | 428/698 X |
| 4,581,279 | 4/1986 | Sugishita et al. | 428/698 X |

*Primary Examiner*—Nancy A. B. Swisher
*Attorney, Agent, or Firm*—Oblon, Fisher, Spivak, McClelland & Maier

[57] ABSTRACT

A silicon carbide sintered body containing not less than 0.03% by weight of boron, a total of not more than 0.3% by weight of metallic element impurities including the boron, not more than 1.0% by weight of free carbon, a total of not more than 0.15% by weight of non-metal impurities other than the free carbon, and the balance essentially consisting of silicon carbide, and having a density of not less 3.10 g/cm$^3$. The sintered body is manufactured by heating a molding of a mixture containing a silicon carbide powder, a boron-containing sintering assistant, and a carbon-containing oxygen scavenger to a sintering temperature. The molded body is maintained at a temperature lower than the sintering temperature during the heating process until an oxide film covering the silicon carbide powder is substantially removed by the oxygen scavenger, and the molded body is then sintered at the sintering temperature under a non-pressurized condition.

18 Claims, No Drawings

SILICON CARBIDE SINTERED BODY AND METHOD OF MANUFACTURING THE SAME

BACKGROUND OF THE INVENTION

1. Field of the Invention

The present invention relates to a silicon carbide sintered body and a method of manufacturing the same.

2. Description of the Prior Art

A silicon carbide sintered body has good oxidation resistance, corrosion resistance, thermal shock resistance, and mechanical strength, and has been studied for use as a high-temperature structural material for a gas turbine part, high-temperature heat exchanger, and the like.

Since silicon carbide powder as a raw material is hard to sinter, it has been sintered by a compression sintering process. However, in order to obtain a sintered body of a complex shape and to simplify a manufacturing process, an ambient pressure sintering process using a sintering assistant, e.g., boron, has been studied (for example, Japanese Patent Disclosure Nos. 50-78609 and 51-148712). With the ambient pressure sintering process, a sintered body of a complex shape can be manufactured in high yields. However, although boron contributes to densifying of the sintered body, it also causes a decrease in high-temperature mechanical strength of the sintered body. A carbon-containing oxygen scavenger, which is used for removing oxygen in the silicon carbide powder, plays an important role in densifying of the sintered body, but reduces the oxidation resistance of the sintered body.

For this reason, attempts have been made to improve the characteristics of the silicon carbide sintered body by decreasing the amount of boron added. For example, in a method described in Japanese Patent Disclosure No. 60-186467, a boron carbide powder having a large specific surface area is used as a boron source to reduce the amount of boron. Japanese Patent Disclosure No. 60-246263 describes a method wherein polyphenyl boron is used as boron and carbon sources.

As described above, although some methods associated with the ambient pressure sintering process for a silicon carbide sintered body have been proposed, silicon carbide sintered bodies obtained by these conventional methods are unsatisfactory in terms of high-temperature mechanical strength, oxidation resistance, and corrosion resistance.

SUMMARY OF THE INVENTION

It is therefore an object of the present invention to provide a silicon carbide sintered body having a good high-temperature mechanical strength and oxidation resistance, and a method of manufacturing the same.

According to the present invention, there is provided a silicon carbide sintered body containing not less than 0.03% by weight of boron, a total of not more than 0.3% by weight of metallic element impurities including the boron, not more than 1.0% by weight of free carbon, a total of not more than 0.15% by weight of nonmetal impurities other than the free carbon, and the balance consisting essentially of silicon carbide, and having a density of not less than 3.10 g/cm$^3$.

The silicon carbide sintered body of the present invention is manufactured by:

(a) molding a mixture containing a silicon carbide powder, a boron-containing sintering assistant, and a carbon-containing oxygen scavenger;

(b) heating the resulting molded body to a sintering temperature;

(c) maintaining the molded body at a temperature lower than the sintering temperature during the heating process in step (b) until an oxide film covering the silicon carbide powder is substantially removed by the oxygen scavenger; and (d) sintering the molded body at the sintering temperature under ambient pressure or reduced pressure.

DESCRIPTION OF THE PREFERRED EMBODIMENT

When a silicon carbide sintered body of the present invention is to be manufactured, a starting mixture containing a silicon carbide powder, a boron-containing sintering assistant, and a carbon-containing oxygen scavenger is prepared. The silicon carbide powder used herein can be either an axonometric $\alpha$-silicon carbide powder, an isometric $\beta$-silicon carbide powder, or a mixture thereof. The silicon carbide powder preferably has an average particle size of 1 $\mu$m or less and a specific surface area of 5 m$^2$/g or more and, more preferably, has an average particle size of 0.5$\mu$m or less and a specific surface area of 10 m$^2$/g or more. If coarse particles having a size exceeding this upper limit are used, the resultant sintered body has a density of less than 3.10 g/cc, and a sintered body having a uniform dense texture cannot often be obtained.

The silicon carbide powder has been manufactured by various methods. An untreated silicon carbide powder contains contaminants, such as free silicon, free silicon dioxide, free carbon, and various metal impurities, which interfere with sintering or can be easily converted to defects in the sintered body. These contaminants are normally removed (e.g., by pickling) and the content of each metal impurity contained in the starting silicon carbide powder is preferably 0.05% by weight or less.

The boron-containing sintering assistant liberates boron at high temperature, and the liberated boron is diffused in silicon carbide particles to improve the sintering property of silicon carbide. A boron compound which is decomposed during a heating process up to a sintering temperature to leave boron is preferably used as the sintering assistant. Since it is preferable that the starting mixture is sufficiently mixed in a solvent (in particular, an organic solvent, as will be described later), a boron compound which is soluble in a solvent (in particular, an organic solvent), is preferably used as the sintering assistant. In addition, a boron-containing sintering assistant which contains no oxygen or will not produce an oxygen-containing intermediate during the decomposition process is more preferable. Examples of such boron-containing sintering assistants include B$_{10}$H$_{14}$ (decaborane), B$_{10}$H$_{13}$I (iododecaborane), {(C$_2$H$_5$)$_3$NH}$_2$(B$_{10}$H$_{12}$), (CH$_3$)$_2$NH.BH$_3$, and carborane such as B$_{10}$H$_{12}$C$_2$. Of these compounds, carborane, e.g., B$_{10}$H$_{12}$C$_2$, which requires addition in only a small amount because of its high boron content and is decomposed without being melted to allow uniform dispersion of boron, is particularly preferable.

The boron-containing sintering assistant is preferably added in an amount sufficient to provide 0.05 to 1% by weight of boron with respect to the weight of silicon carbide powder. If boron is provided in an amount of less than 0.05% by weight, an addition effect is insufficient. Since the solid solution ratio of boron to silicon carbide is at most 0.3% by weight, addition of boron in an amount exceeding 1% by weight results in incomplete escape of excess portion of boron from the molded body during the decomposition of the boron compound and causes excess boron precipitation in silicon carbide grain boundaries, leading to a decrease in mechanical strength of the sintered body.

Note that boron nitride, boron trioxide, boron carbide, elemental boron and the like are known as the boron-containing sintering assistant. However, it is difficult to uniformly mix a small amount of any of these compounds with the silicon carbide powder. In addition, boron carbide begins to sublimate from 1,800° to 1,900° C. and the residual boron content is undesirably reduced, thus providing only an unsatisfactory sintering assistant effect. If boron nitride is used, nitrogen atoms interfere with sintering. Boron trioxide easily forms a liquid phase/second phase to reduce the mechanical strength of the resultant sintered body. When these compounds are used as the sintering assistant, it is difficult to reduce an amount of the sintering assistant to be used while maintaining required characteristics of the sintered body.

The carbon-containing oxygen scavenger removes oxygen which is present in the form of an oxide on the surface of silicon carbide powder, and is a carbon compound which is decomposed at high temperature to leave free carbon. As the oxygen scavenger, a carbon compound which is decomposed under a non-oxidation atmosphere during a heating process up to the sintering temperature to leave carbon is preferable. Since it is preferable that the above-mentioned starting mixture can be sufficiently mixed in a solvent, more particularly, an organic solvent, as will be described later, a carbon compound which is soluble in a solvent, more particularly, an organic solvent, is preferably used as the oxygen scavenger. Examples of such oxygen scavengers include coal-tar pitch, petroleum pitch, fuel oil, phenolic resin, more particularly, novolak resin, and the like. A carbon compound which is solidified when the organic solvent is volatilized upon increase in temperature, and thereafter is decomposed without being melted to leave and uniformly disperse carbon is more preferable. Such a carbon compound is a phenolic resin, e.g., a novolak resin.

The carbon-containing oxygen scavenger is added in an amount by which oxygen contained in the silicon carbide powder is substantially completely removed and excess carbon is not left in the resultant sintered body. Normally, the carbon-containing oxygen scavenger is preferably added in an amount sufficient to provide a carbon content (based on weight) 1.0 to 3.0 times an oxygen content in the silicon carbide powder. The amount of the carbon-containing oxygen scavenger to be added can be calculated based on its residual carbon ratio. The oxygen content in silicon carbide can be easily measured.

Note that the boron-containing sintering assistant and the carbon-containing oxygen scavenger can be provided by a single compound (i.e., a compound containing both boron and carbon).

The silicon carbide powder, the boron-containing sintering assistant, and the carbon-containing oxygen scavenger are sufficiently mixed and granulated preferably in a solvent, more particularly, in an organic solvent. As the solvent, paraffin hydrocarbons (from pentane to cetane), alcohols (methanol, ethanol, butanol, propanol, and the like), acetone, trichrene, methachrene, ethylene glycol, and the like are preferably used.

If necessary for molding, a temporary binder, e.g., stearic acid, paraffin, electron wax, or polyvinyl alcohol, can be mixed together with the raw materials.

After the starting material mixture is sufficiently mixed, the resultant mixture is dried and granulated by means of spray drying, freeze drying, or the like. Thereafter, the resultant mixture is compression-molded by a known method, e.g., dry pressing.

The resultant silicon carbide molded body is then heated to the sintering temperature. At this time, the molded body is first heated to about 700° C. During the heating process, when the temporary binder is used, it is decomposed and volatilized, and the carbon-containing oxygen scavenger and the boron-containing sintering assistant are decomposed after they are solidified, thus respectively providing free carbon and free boron. Then, these free elements are uniformly dispersed on the surface of the silicon carbide powder.

The heating process for heating the molded body to about 700° C. is preferably performed as slowly as possible. An abrupt increase in temperature causes the molded body to crack or to form pores, thus damaging the molded body. The heating process is preferably performed at a rate of 0.01° C./min to 1° C./min, depending on the size of the molded body. In order to suppress oxidation of the silicon carbide powder as much as possible during the heating process, the heating process is preferably performed in a non-oxidation atmosphere, e.g., in vacuum, or in an inert gas atmosphere, e.g., Ar gas.

When the temperature is further increased to a temperature range of 1,300° C. to 1,550° C., reduction of an oxide film and free silicon dioxide on the silicon carbide powder surface caused by free carbon and fusion of silicon and silicon dioxide occur, and they are volatilized in the forms of carbon monoxide, silicon, and silicon dioxide. When the temperature is further increased to a level at which silicon carbide particles begin to grow, if the oxide film on the silicon carbide powder surface, free silicon, and free silicon dioxide, in particular, the oxide film on the silicon carbide powder surface, remain, evaporation, solidification, and diffusion of these elements on the silicon carbide powder surface are locally promoted or suppressed, thus easily causing abnormal particle growth. For this reason, the temperature is slowly increased up to about 1,500° C. at a vacuum pressure ($10^{-3}$ Torr or lower) (at a rate of 1° C./min to 10° C./min), and temperature is maintained within this temperature range, particularly, about 1,450° C. to 1,550° C., until the oxide film on the silicon carbide powder surface is substantially reduced by the oxygen scavenger (a deoxidation process). Whether or not the oxide film is substantially completely reduced can be detected by maintaining the temperature in this range under a constant evacuation condition at a pressure of $10^{-3}$ Torr or lower and observing a change in pressure. More specifically, while the temperature is maintained, volatilized materials containing a gassified reduction product (e.g., carbon monoxide) of the oxide film are generated by the oxygen scavenger and the vacuum degree is lowered. However, when generation of these volatilized materials is stopped, the vacuum degree is returned to a value before it is lowered. Therefore, the temperature can be maintained at a reduced pressure of $10^{-3}$ Torr or lower until the vacuum degree is lowered and the vacuum degree is then recovered to that before lowering.

When the oxide film covering the silicon carbide powder is substantially reduced and removed, the temperature is increased to the sintering temperature of about 1,800° C. to 2,200° C. From 1,600° C. in this heating process, evaporation, solidification, and surface diffusion of silicon carbide causing gas-phase sintering which prevents densifying become gradually noticeable and the silicon carbide powder particles begin to coarsen. Solid-phase diffusion and volume diffusion sintering resulting in densifying are not yet in progress. Since gas-phase sintering prevails within a temperature range of 1,600° C. to 1,800° C., when the sintering temperature ranging from 1,800° C. to 2,200° C. is reached, the silicon carbide particles size exceeds about more than 1 μm, and this makes use of fine starting silicon carbide powder invalid.

The present inventors found that gas-phase sintering could be suppressed and the silicon carbide particle could be substantially prevented from being coarsened by performing the heating process up to the sintering temperature in a non-oxidation atmosphere (hydrogen, nitrogen, or carbon monoxide). Therefore, after the oxide film on the silicon carbide powder is removed, heating to the sintering temperature is preferably performed in a non-oxidation atmosphere (particle coarsening prevention process). In this way, silicon carbide can be sintered in the form of fine powder.

When the temperature is increased to the sintering temperature ranging from about 1,800° C. to 2,200° C. at which solid-phase diffusion becomes noticeable, the sintering temperature is maintained and silicon carbide is sintered at non-pressurized conditions. Sintering is referably performed for 0.5 hours to 4 hours. Note that during sintering, atmosphere is preferably switched from the non-oxidation atmosphere to vacuum ($10^{-3}$ Torr or lower) or an inert gas atmosphere (helium, neon, argon, or the like) to maintain the sintering temperature. Silicon carbide is decomposed to vapor (Si, $Si_2C$, and the like) rich in carbon and silicon at high temperatures. Since an inert gas, e.g., helium, neon, argon, or the like, can suppress sublimation and decomposition of silicon carbide to a certain degree, sintering is performed more preferably in an inert gas atmosphere.

A sintered body manufactured by the method of the present or reduced pressure invention described above can minimize its contents of components other than silicon carbide and, more specifically, has a high high-temperature mechanical strength.

Boron is an inevitable component for ambient pressure or reduced pressure sintering, and 0.03% by weight or more of boron must be left in the resultant sintered body. However, an excessive amount of boron causes a decrease in sintered body mechanical strength due to precipitation of the second phase and also causes oxidation resistance and corrosion resistance of the sintered body. In addition, when other metallic elements, such as aluminum, iron, titanium, chromium, calcium, magnesium, zirconium, vanadium, free silicon, and the like are left in the sintered body, they also cause a decrease in high-temperature mechanical strength of the sintered body. Therefore, the content of the metallic elements including boron is 0.3% by weight or less. The content of boron is preferably less than 0.15% by weight, more preferably, less than 0.14% by weight, and particularly preferably, less than 0.13% by weight.

If free carbon is excessively present in the sintered body, it causes a decrease in oxidation resistance and mechanical strength. Therefore, the content of free carbon in the sintered body is at most 1.0% by weight, and preferably, 0.5% by weight or less. However, if the free carbon content is too low, oxygen contained in the silicon carbide powder is not sufficiently removed, and the density of the sintered body is decreased. Therefore, in practice, the content of free carbon left in the sintered body must be 0.05% by weight or more.

In addition, oxygen, nitrogen, and the like as nonmetals other than carbon also cause a decrease in mechanical strength of the sintered body, and a total content thereof is preferably 0.15% by weight or less. In particular, since oxygen decreases the density and the mechanical strength of the sintered body, the oxygen content must be decreased to 0.1% by weight or less.

The density of the sintered body must be 3.10g/cc or higher. If it is lower than this value, too many pores are formed, which degrade the mechanical strength.

The silicon carbide sintered body having the above-mentioned characteristics can be obtained by the method of the present invention.

The present invention will be described in more detail by way of its examples.

EXAMPLE 1

100 g of a commercially available α-SiC powder (a specific surface area was $15m^2/g$, a total oxygen content was 1.4% by weight, and a total content of other metallic impurities was less tham 0.05% by weight) were weighed as a starting raw material. Carborane corresponding to 0.4 g as B element, novolac resin corresponding to 3.0 g as residual C element (residual carbon ratio of 59%), and 10 cc of ethylene glycol were dissolved in 100 cc of acetone. The SiC powder was dipped and stirred in the acetone solution, and was then dried and granulated. Samples each weighing 20 g were compression-molded using a 4.35×3.35 $cm^2$ mold at 1 ton/$cm^2$ and, thereafter, were rubber-pressed at 3 ton/$cm^2$ Each molded sample was heated to 700° C. in a nitrogen atmosphere over eight hours, thus obtaining a degreased molded body. The degreased molded body was placed in a graphite double container which was, in turn, set in an electric furnace. After the interior of the furnace was evacuated to a vacuum, the heater was manually energized up to about 1,200° C. so as to slowly increase the temperature within a range of 1,300 to 1,500° C. at a rate of 500° C./H, during which a vacuum pressure was reduced due to CO gas generation from the sample. Then, the temperature of about 1,550° C. was maintained at a vacuum pressure for 60 minutes (a deoxidation process), thereby thoroughly effecting gas generation deaeration. Thereafter, the temperature was increased up to 2,050° C. at a rate of 1,000° C./H, and the sample was sintered in Ar gas flow at 2,050° C. for two hours. As a result, a sintered body (a sintering density of 3.15 g/cc and an average grain size of 4 μm) was obtained. The composition analysis result of this sintered body was as follows: 0.14% (B), 0.03% (Al), 0.006% (Fe), 0.4% (free C), 0.08% (oxygen), and 0.01% (N). When a transverse strength test sample of a sectional area of 3×4 $mm^2$ was prepared in accordance with the JIS standards and a three-point bending test was conducted at a span of 30 mm, the transverse strength thereof was 80 kg/$mm^2$ at room temperature and 83 kg/$mm^2$ at 1,500° C. The fracture toughness at room temperature was 4MPa$\sqrt{}$m.

EXAMPLE 2

After a sample was prepared and the manufacturing process was performed to the deoxidation process by the same method as in Example 1, the temperature was increased in $N_2$ gas flow up to 1,800° C. at a rate of 1,000° C./H, and the interior of the furnace was evacuated to a vacuum while maintaining the sample at this temperature. Thereafter, the temperature was further increased to 2,050° C., the sintering was performed in Ar gas flow for two hours. The resultant sintered body had a density of 3.15 g/cc and an average grain size of 1.5 μm, and its composition analysis result provided 0.13% (B), 0.04% (Al), 0.4% (free C), 0.04% (oxygen), and 0.04% (N). In the strength test, the mechanical strength was 81 kg/mm² at room temperature and 84 kg/mm² at 1,500° C., and the fracture toughness was 5 MPa√m.

EXAMPLE 3

After the sample was prepared and the manufacturing process was performed to the deoxidation process by the same method as in Example 1, the temperature was increased in $N_2$ gas flow up to 1,900° C. Thereafter, evacuation was performed and sintering was conducted in Ar gas flow at 2,050° C. for two hours. The resultant sintered body had a density of 3.18 g/cc and an average grain size of 1.1 μm. The composition analysis result was substantially the same as that of Example 2. In the strength test, the mechanical strength was 87 kg/mm² at room temperature and 90 kg/mm² at 1,500° C., and the fracture toughness was 6 MPa√m.

EXAMPLE 4

After the sample was prepared and the manufacturing process was performed to the deoxidation process by the same method as in Example 1, the temperature was increased in $N_2$ gas flow up to 2,000° C. Thereafter, evacuation was performed and sintering was conducted in Ar gas flow at 2,050° C. for two hours. The resultant sintered body had a density of 3.16 g/cc and an average grain size of 0.9 μm. The composition analysis result was substantially the same as that in Examples 2 and 3. In the strength test, the mechanical strength was 85 kg/mm² at room temperature and 87 kg/mm² at 1,500° C., and the fracture toughness was 6 MPa√m.

EXAMPLE 5

After the sample was prepared and the manufacturing process was performed to the deoxidation process by the same method as in Example 1, the temperature was increased in $N_2$ gas flow up to 2,050° C. After evacuation was performed, Ar gas was supplied and sintering was conducted for two hours. The resultant sintered body had a density of 3.14 g/cc and an average grain size of 2.0 μm. From the strength test, the mechanical strength was 82 kg/mm² at room temperature and 80 kg/mm² at 1,500° C., and the fracture toughness was 5 MPa√m.

EXAMPLE 6

Sintered bodies were prepared under different conditions as shown in Table 1. Table 1 also shows the characteristics of the resultant sintered bodies.

TABLE 1

| Sample No. | Oxygen scavenger (wt %) | Sintering Assistant (wt %) | Deoxidation process | Coarsening prevention process | Sintering condition |
|---|---|---|---|---|---|
| The present invention | | | | | |
| 1 | Nv 3.0 | Cb 0.4 | In vacuum atmosphere 1530° C. × 1 H | $H_2$ | In Ar atmosphere 2050° C. × 1 H |
| 2 | Nv 3.0 | Cb 0.4 | In vacuum atmosphere 1530° C. × 1 H | $N_2$ | In Ar atmosphere 2050° C. × 1 H |
| 3 | Nv 3.0 | Cb 0.4 | In vacuum atmosphere 1530° C. × 1 H | CO | In Ar atmosphere 2050° C. × 1 H |
| 4 | Nv 2.5 | Cb 0.4 | In vacuum atmosphere 1530° C. × 1 H | — | In Ar atmosphere 2050° C. × 1 H |
| 5 | Nv 3.0 | Cb 0.4 | In vacuum atmosphere 1530° C. × 1 H | — | In Ar atmosphere 2050° C. × 1 H |
| 6 | Nv 4.0 | Cb 0.4 | In vacuum atmosphere 1530° C. × 1 H | — | In Ar atmosphere 2050° C. × 1 H |
| 7 | Nv 3.0 | Cb 0.8 | In vacuum atmosphere 1530° C. × 1 H | — | In Ar atmosphere 2050° C. × 1 H |
| 8 | Nv 3.0 | Cb 0.4 | In vacuum atmosphere 1530° C. × 1 H | — | In Ar atmosphere 2050° C. × 1 H |
| 9 | Nv 3.0 | Cb 0.2 | In vacuum atmosphere 1530° C. × 1 H | — | In Ar atmosphere 2050° C. × 1 H |
| 10 | Nv 3.0 | Cb 0.1 | In vacuum atmosphere 1530° C. × 1 H | — | In Ar atmosphere 2050° C. × 1 H |
| 11 | Nv 3.0 | Cb 0.05 | In vacuum atmosphere 1530° C. × 1 H | — | In Ar atmosphere 2050° C. × 1 H |
| Comparative Example | | | | | |
| 12 | Nv 3.0 | Cb 0.02 | In vacuum atmosphere 1530° C. × 1 H | — | In Ar atmosphere 2050° C. × 1 H |
| 13 | Nv 3.0 | Cb 0.2 | — | — | In Ar atmosphere 2050° C. × 1 H |
| 14 | Nv 3.0 | ac 0.3 | In vacuum atmosphere 1530° C. × 1 H | — | In Ar atmosphere 2050° C. × 1 H |
| 15 | ac 3.0 | Cb 0.2 | In vacuum atmosphere 1530° C. × 1 H | — | In Ar atmosphere 2050° C. × 1 H |
| 16 | Nv 3.0 | Cb 1.6 | In vacuum atmosphere 1530° C. × 1 H | — | In Ar atmosphere 2050° C. × 1 H |

| Density | B content | Other metal content | Free carbon content | Oxygen content | Other non-metal content | Mechanical strength (kg/mm²) |
|---|---|---|---|---|---|---|

TABLE 1-continued

| Sample No. | (g/cm) | (wt %) | (wt %) | (wt %) | (wt %) | (wt %) | Room temperature | 1500° C. |
| --- | --- | --- | --- | --- | --- | --- | --- | --- |
| The present invention | | | | | | | | |
| 1 | 3.19 | 0.13 | 0.04 | 0.4 | 0.04 | 0.01 | 90 | 92 |
| 2 | 3.18 | 0.13 | 0.04 | 0.4 | 0.04 | 0.04 | 87 | 90 |
| 3 | 3.18 | 0.13 | 0.04 | 0.4 | 0.05 | 0.03 | 84 | 84 |
| 4 | 3.16 | 0.14 | 0.03 | 0.05 | 0.14 | 0.01 | 59 | 60 |
| 5 | 3.15 | 0.14 | 0.03 | 0.4 | 0.08 | 0.01 | 80 | 83 |
| 6 | 3.14 | 0.14 | 0.03 | 1.0 | 0.01 | 0.01 | 85 | 60 |
| 7 | 3.18 | 0.24 | 0.05 | 0.3 | 0.07 | 0.02 | 83 | 72 |
| 8 | 3.17 | 0.14 | 0.05 | 0.3 | 0.07 | 0.02 | 79 | 84 |
| 9 | 3.16 | 0.12 | 0.05 | 0.3 | 0.07 | 0.02 | 82 | 81 |
| 10 | 3.14 | 0.08 | 0.05 | 0.3 | 0.07 | 0.02 | 81 | 84 |
| 11 | 3.11 | 0.04 | 0.05 | 0.3 | 0.07 | 0.02 | 75 | 79 |
| Comparative Example | | | | | | | | |
| 12 | 3.04 | 0.01 | 0.05 | 0.3 | 0.07 | 0.02 | 50 | 51 |
| 13 | 3.12 | 0.11 | 0.05 | 1.1 | 0.17 | 0.02 | 59 | 55 |
| 14 | 3.08 | 0.27 | 0.03 | 0.9 | 0.09 | 0.03 | 59 | 53 |
| 15 | 3.09 | 0.13 | 0.06 | 1.1 | 0.15 | 0.02 | 62 | 48 |
| 16 | 3.14 | 0.35 | 0.04 | 0.6 | 0.08 | 0.02 | 72 | 50 |

Nv: novolak;
ac: amorphous C;
cb: carborane;
ab: amorphous B
Other metals are mainly Al and Fe.
No other non-metal excluding nitrogen is detected.

As can be apparent from Table 1, samples in examples of the present invention have a good high-temperature mechanical strength.

Since sample No. 12 has a small amount of boron, its density is low and has a poor mechanical strength. Since sample No. 13 is not subjected to the deoxidation process, large amounts of carbon and oxygen are left and the mechanical strength is degraded. Boron is added to sample No. 14 in the form of an amorphous boron powder, and sample No. 14 has a low density and a poor mechanical strength. Carbon is added to sample No. 15 in the form of an amorphous carbon powder, and sample No. 15 has a low density and a poor mechanical strength. Sample No. 16 has a high boron content, and also has a poor mechanical strength.

In the examples of the present invention, when the boron content is 0.03 to 0.15% by weight, the free carbon content is 1.0 by weight or less, and the oxygen content is less than 0.1% by weight, the resultant sintered body has a good high-temperature mechanical strength of $\delta f$ (1,500° C.) $\leqq$ 60 kg/mm$^2$.

Comparison of oxidation resistance and corrosion resistance was made. As is apparent from Table 2, the sintered body of the present invention has better oxidation resistance and corrosion resistance than those of Comparative Examples.

TABLE 2

| Comparison of oxidation resistance and alkali resistance | | Oxidation resistance (weight increment) | Alkali resistance (weight decrement) |
| --- | --- | --- | --- |
| Example | Sample No. 8 | 0.05 mg/cm$^2$ | 0.4 mg/cm$^2$ |
| Compartive Example | Sample No. 13 | 0.20 mg/cm$^2$ | 0.7 mg/cm$^2$ |
| Compartive Example | Sample No. 15 | 0.50 mg/cm$^2$ | 0.7 mg/cm$^2$ |
| Compartive Example | Sample No. 16 | 0.15 mg/cm$^2$ | 0.8 mg/cm$^2$ |

Conditions:
Oxidation resistance 1500° C. × 50 H in air
Alkali resistance 450° C. × 15 min in KOH—NaOH solution According to the present invention as described above, the silicon carbide sintered body has low B and C contents as components other the SiC, and, in particular, the oxygen content thereof is reduced. Therefore, the sintered body has a high mechanical strength at high temperatures and satisfactory toughness.

What is claimed is:

1. A silicon carbide sintered body containing from not less than 0.03% by weight to not more than 0.14% by weight of boron, a total of not more than 0.3% by weight of metallic element impurities including the boron, each metallic impurity, other than boron, being present in an amount of at most 0.05% by weight, not more than 1.0% by weight of free carbon, a total of not more than 0.15% by weight of non-metal impurities other than the free carbon, and the balance essentially consisting of silicon carbide, and having a density of not less 3.10 g/cm$^3$.

2. A sintered body according to claim 1, wherein a content of oxygen as the non-metal impurity is not more than 0.1% by weight.

3. A sintered body according to claim 1, wherein a content of free carbon is not more than 0.5% by weight.

4. A sintered body according to claim 1, wherein a content of free carbon is not less than 0.05% by weight.

5. A method of manufacturing a silicon carbide sintered body under a non-pressurized condition, comprising the steps of:

(a) molding a mixture containing a silicon carbide powder, a boron-containing sintering assistant, and a carbon-containing oxygen scavenger wherein the content of each metal impurity, other than boron, in the silicon carbide powder is not more than 0.05% by weight, and wherein said mixture consists essentially of boron-containing sintering assistant in an amount sufficient to provide 0.05 to 1% by weight of boron with respect to the weight of the silicon carbide powder, the carbon-containing scavenger in an amount sufficient to provide carbon content 1.0 to 3.0 times that of the oxygen content in the silicon carbide powder;

(b) heating the resultant molded body to a sintering temperature;

(c) maintaining the molded body at a temperature lower than the sintering temperature during the heating process in step (b) until an oxide film covering the silicon carbide powder is substantially removed by the oxygen scavenger; and (d) sintering the molded body at the sintering temperature under a non-pressurized condition.

6. A method according to claim 5, wherein in the step (c), the temperature of the molded body is maintained with a range of 1,300° C. to 1,550° C.

7. A method according to claim 6, wherein the step (c) is performed at a vacuum pressure of not more than $10^{-3}$ Torr, and the molded body is maintained at this temperature in the step (c) until the vacuum pressure is temporarily reduced and the vacuum pressure is recovered to a value before reduction.

8. A method according to claim 5, wherein in the heating process of the step (b), temperature increase from 1,600° C. to less than said sintering temperature is performed in a non-oxidation gas atmosphere.

9. A method according to claim 8, wherein the non-oxidation gas atmosphere consists of one member selected from the group consisting of hydrogen gas, nitrogen gas, and carbon monoxide gas.

10. A method according to claim 5, wherein sintering in the step (d) is performed at a temperature ranging from 1,800° C. to 2,200° C.

11. A method according to claim 9, wherein sintering is performed in a vacuum or in an inert gas atmosphere.

12. A method according to claim 5, wherein the sintering assistant is a solvent-soluble boron compound which is decomposed in the heating process of the step (b) to leave boron.

13. A method according to claim 12, wherein the boron compound does not contain oxygen.

14. A method according to claim 13, wherein the boron compound consists of $B_{10}H_{14}$, $B_{10}H_{13}I$, $\{(C_2H_5)_3NH\}_2(B_{10}H_{12})$, $(CH_3)_2NH \cdot BH_3$, or a carborane compound.

15. A method according to claim 5, wherein the oxygen scavenger is a solvent soluble carbon compound which is decomposed in the heating process of the step (b) to leave carbon.

16. A method according to claim 15, wherein the oxygen scavenger is selected from the group consisting of coal-tar pitch, petroleum pitch, fuel oil, and a phenol resin.

17. A method according to claim 5, wherein the silicon carbide powder has an average particle size of not more than 1 $\mu$m and a specific surface area of not less than 5 $m^2/g$.

18. A method according to claim 5, wherein the silicon carbide powder has an average particle size of not more than 0.5 $\mu$m and a specific surface area of not less than 10 $m^2/g$.

* * * * *